C. C. FOOTE.
ENAMELED METALLIC ICE PITCHER.
No. 79,335. Patented June 30, 1868.
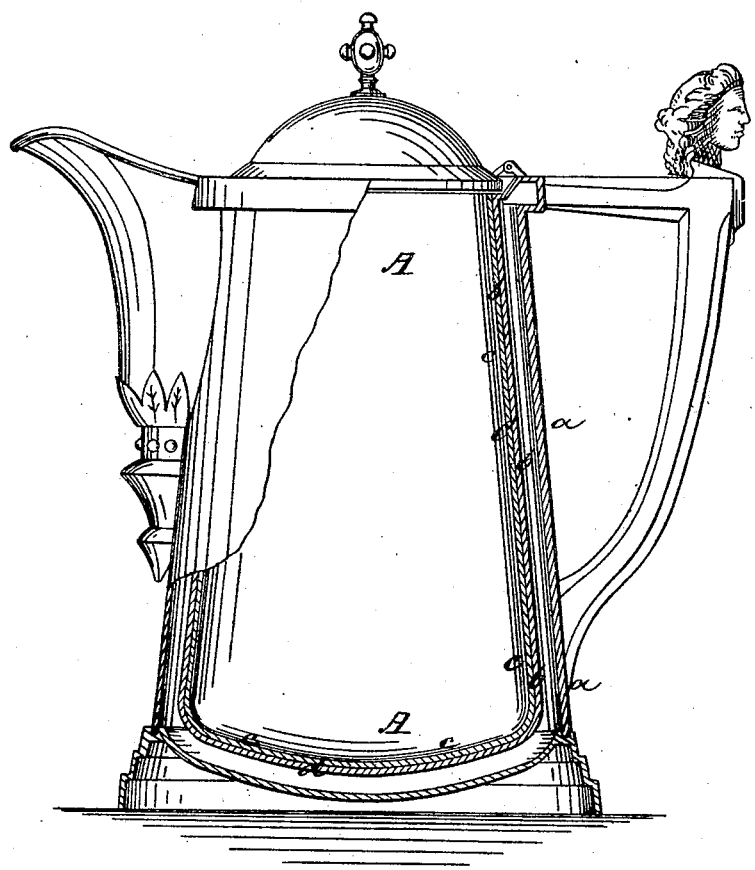
Witnesses
Wm. A. Morgan
G. C. Cotton
Inventor
C. C. Foote
per Munn & Co
Attorneys

United States Patent Office.

CHARLES C. FOOTE, OF WEST MERIDEN, CONNECTICUT, ASSIGNOR TO MERIDEN BRITANNIA COMPANY, OF SAME PLACE.

*Letters Patent No. 79,335, dated June 30, 1868.*

IMPROVED ENAMELLED METALLIC ICE-PITCHERS.

The Schedule referred to in these Letters Patent and making part of the same.

TO ALL WHOM IT MAY CONCERN:

Be it known that I, CHARLES C. FOOTE, of West Meriden, in the county of New Haven, and State of Connecticut, have invented a new and improved Ice-Pitcher; and I do hereby declare that the following is a full, clear, and exact description thereof, which will enable others skilled in the art to make and use the same, reference being had to the accompanying drawings, forming part of this specification.

The drawing represents a sectional elevation of my improved ice-pitcher.

This invention relates to a new ice-pitcher, which is enamelled on the inside, so that the metal cannot be scratched and injured by the ice, while the taste and quality of the water cannot be spoiled by the corrosion of the metal.

The pitcher A is of suitable construction, and is by preference provided with double walls, $a$ and $b$, which is, however, already frequently done. A lining, $e$, of enamel is applied in a liquid state to the inside of the pitcher, so as to cover the bottom, $d$, and inner wall of the same, as indicated in the drawing. The enamel, after having been applied, is burnt in a kiln, and may then be glazed or finished in any suitable manner. The enamel being very hard, it prevents the ice from injuring the metal of the pitcher, while it at the same time prevents the water, as well as the ice, from coming in contact with the metal.

I do not confine myself to any particular composition for the enamel. The same may be of any suitable color and thickness.

I am aware that solid porcelain or enamel plates have already been introduced in ice-pitchers, to form a non-metallic lining for the same; but such lining had to be made in section, that is, had to be composed of a series of plates, and was therefore neither water-tight nor as solid as is required.

I do not claim broadly the enamel lining for ice-pitchers, but

I do claim, and desire to secure by Letters Patent—

Coating the inside of metallic ice-pitchers with enamel, by applying the enamel in a liquid state to the metallic inner surfaces, substantially as herein shown and described.

CHAS. C. FOOTE.

Witnesses:
ORVILLE H. PLATT,
ELI BUTLER.